US00RE36642E

United States Patent [19]

Ziadi

[11] E Patent Number: Re. 36,642

[45] Reissued Date of Patent: Apr. 4, 2000

[54] FIBER-OPTIC LIGHTING SYSTEM

[76] Inventor: Bouchaib Ziadi, 4810 Blackjack Rd., Red Bud, Ill. 62278

[21] Appl. No.: 09/350,472

[22] Filed: Jul. 9, 1999

Related U.S. Patent Documents

Reissue of:

[64] Patent No.: 5,647,658
Issued: Jul. 15, 1997
Appl. No.: 08/439,431
Filed: May 11, 1995

[51] Int. Cl.[7] ..... B60Q 3/00; F21V 8/00

[52] U.S. Cl. ..... 362/471; 362/490; 362/493; 362/511; 362/551

[58] Field of Search ..... 362/471, 490, 362/493, 511, 551

[56] References Cited

U.S. PATENT DOCUMENTS 3,683,167 8/1972 Rishton .
3,723,722 3/1973 van Iderstine et al. .
4,597,033 6/1986 Meggs et al. .
4,765,701 8/1988 Cheslak .
4,811,172 3/1989 Davenport et al. .
4,868,718 9/1989 Davenport et al. .
4,947,293 8/1990 Johnson et al. .
4,949,227 8/1990 Finch et al. .
4,958,263 9/1990 Davenport et al. .
5,042,894 8/1991 Swemer .
5,072,338 12/1991 Hug et al. .
5,122,933 6/1992 Johnson .
5,184,883 2/1993 Finch et al. .
5,311,410 5/1994 Hsu et al. .
5,483,427 1/1996 Dealey et al. .

*Primary Examiner*—Thomas M. Sember
*Attorney, Agent, or Firm*—Senniger, Powers, Leavitt & Roedel

[57] ABSTRACT

A fiber-optic lighting system is powered by a power supply connected to a high intensity light source which generates a beam of light. A first elongate light guide extends between a first end positioned within the beam of light and a second end positioned adjacent a lamp reflector. A second elongate light guide which is configured to emit light from a side also extends from a first end positioned within the beam of light. An elongate light fixture is positioned along the second light guide for directing light emitted from the side of the light guide.

29 Claims, 4 Drawing Sheets

FIBER-OPTIC LIGHTING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to a fiber-optic lighting system. In particular, the preferred embodiment of the present invention is intended to light the cabin interior of commercial passenger aircraft by transmitting light from a remote light source to individual light fixtures throughout the aircraft.

2. Description of the Related Art

Since people have been traveling by aircraft at night, there has been a need to light aircraft cabins to enable passengers to see. In the past, conventional incandescent and fluorescent lighting systems have been used to provide aircraft lighting. However, as will be explained below, these systems have numerous drawbacks.

The primary drawback associated with conventional lighting systems is that they require that many lamps be used throughout the aircraft. Each lamp increases the weight of the aircraft. Although increases in weight are undesirable in most apparatus, weight increases are especially undesirable in aircraft because every increase must be overcome by additional engine thrust in order to sustain flight. Added thrust requires more powerful and more expensive aircraft engines which also cost more to operate. Thus, weight increases the cost to the aircraft operator every time the aircraft leaves the ground.

Additional lamps also increase the electrical load on the aircraft electrical power distribution system. Because each lamp acts as an electrical resistance in the power distribution system and increases the load on the system, additional electrical power is required to light every additional lamp. Thus, the more lamps which are aboard the aircraft, the higher the potential electrical power requirement and the larger the power distribution system needed. Because larger power distribution systems cost more and weigh more, the addition of lamps further increases cost and weight.

Additional lamps also increase the maintenance costs associated with the lighting system because each lamp is a potential failure site which must be checked on a regular basis and replaced if necessary. Thus, as more lamps are used, the number of potential failure sites and the potential for the failure of at least one lamp increase. When a lamp fails, it must be replaced at an expense that includes not only the cost of the replacement lamp but also the cost of the labor associated with replacing the lamp. Therefore, as more lamps are used, the overall maintenance cost of the aircraft lighting system increases. Conversely, as fewer lamps are used, the overall maintenance cost decreases.

In addition, each lamp gives off heat. In particular, when incandescent lamps are used, the heat can be great enough to cause injury to persons coming in contact with the light fixtures and can even be great enough to cause a fire under some circumstances. The typical reading light fixture used in aircraft has a metal housing which is mounted in the valance or overhead luggage rack above the heads of seated passengers. The light fixture may be aimed by grasping the housing and swivelling it within its socket to direct the light toward a desired location. However, after a typical incandescent light is illuminated for a short time, the housing can become too hot to touch with bare hands without causing discomfort or even burns. In addition, this heat can become a fire hazard under certain circumstances. As more lamps are used, the potential for injury or fire increases. Thus, in order to minimize the potential of injury and fire, the number of lamps should be minimized and the lamps should be positioned away from passengers and flammable materials.

Many of the problems described above have been eliminated with the advent of fluorescent lighting systems in aircraft. Fluorescent lighting systems use less electrical power and generate less heat than incandescent systems. However, fluorescent lighting systems require ballast resistors, inverters and power units which create high voltage, high frequency, alternating electrical current. Because the fluorescent tubes are spaced throughout the cabin interior, the electrical current is distributed throughout the cabin interior by a power distribution network which can present an electrical hazard. Further, the power distribution network used for fluorescent lights generates high voltage electricity at a high frequency which is a potential source of both electro-magnetic and radio frequency interference. Because electro-magnetic and radio frequency energy can adversely affect aircraft communication, navigation and control systems, sources of electro-magnetic interference and radio frequency interference should be minimized aboard aircraft. In order to minimize these interferences, the size of the electrical power distribution network should be minimized.

Further, fluorescent systems use long, sealed tubes that are more fragile than incandescent lamps. As a result, fluorescent lamps are more easily broken during routine maintenance than incandescent lamps. When lamps are broken, maintenance and housekeeping costs increase. In addition, because the tubes are made of glass, there is a potential for injury associated with broken lamps.

SUMMARY OF THE INVENTION

The inventor has succeeded in developing a fiber-optic lighting system for illuminating the interior of aircraft which offers reduced costs and reduced weight, as well as reduced risk of injury, fire and electrical shock. In addition, the system of the present invention has an increased reliability and a decreased potential for electro-magnetic and radio frequency interference.

The aircraft interior lighting system of the present invention includes a power supply connected to a high intensity light source. Both the power supply and high intensity light source are remotely located away from the main cabin interior thereby reducing the potential for injury and fire hazard in the main cabin. Elongated fiber-optic light guides extend from the light source to various light fixtures located throughout the aircraft cabin interior. The light fixtures are comprised of reflectors, lenses and globes and do not contain lamps. As a result, few, if any, lamps are needed to illuminate the main cabin interior. Thus, electricity need not be transmitted throughout the cabin interior to power the lamps as in earlier lighting systems.

Light switches may be positioned along the light guides to selectively prevent light from being transmitted to individual light fixtures. The controls for these switches may be grouped together on control panels which can be operated by pilots or flight attendants or they may be separately located throughout the cabin within reach of seated passengers.

The light guides used in the lighting system of the present invention emit light in two modes: a side-illumination mode, and an end-illumination mode. The light guides are used in the side-illumination mode in valance light fixtures for general cabin lighting and in emergency floor strip light fixtures for directing passengers to exits during low visibility emergency situations. The light guides are used in the end-illumination mode in reading light fixtures and passenger signal indicator light fixtures. The same light guides may be used both in a side-illumination and in an end-illumination mode or the light guides may be used in only one of the two modes.

The present invention overcomes many of the problems inherent with traditional aircraft lighting systems. In particular, the lighting system of the present invention is a relatively low weight and low power consumption system because fewer lamps are required. In addition, the heat generated by the system is confined to a remote location which is spaced from passengers and is isolated from any areas of the aircraft where conventional lighting could present a fire hazard. Thus, the potential for injury and fire is significantly reduced and confined. Further, because fewer lamps are used in the lighting system, less maintenance is required with the present lighting system than with conventional aircraft lighting systems. In addition, the lighting system has an increased durability over the prior art systems which has the advantage of reducing maintenance costs as well. Still further, the power distribution network of the lighting system of the present invention is significantly smaller than fluorescent lighting system power distribution networks so that the potential for electro-magnetic interference and radio frequency interference is significantly reduced.

BRIEF DESCRIPTION OF THE DRAWINGS

Further objects and features of the present invention are revealed in the following Detailed Description of the Preferred Embodiment of the invention and in the drawing figures wherein.

DETAILED DESCRIPTION OF THE PREFERRED EMBODIMENT

Figure 1:
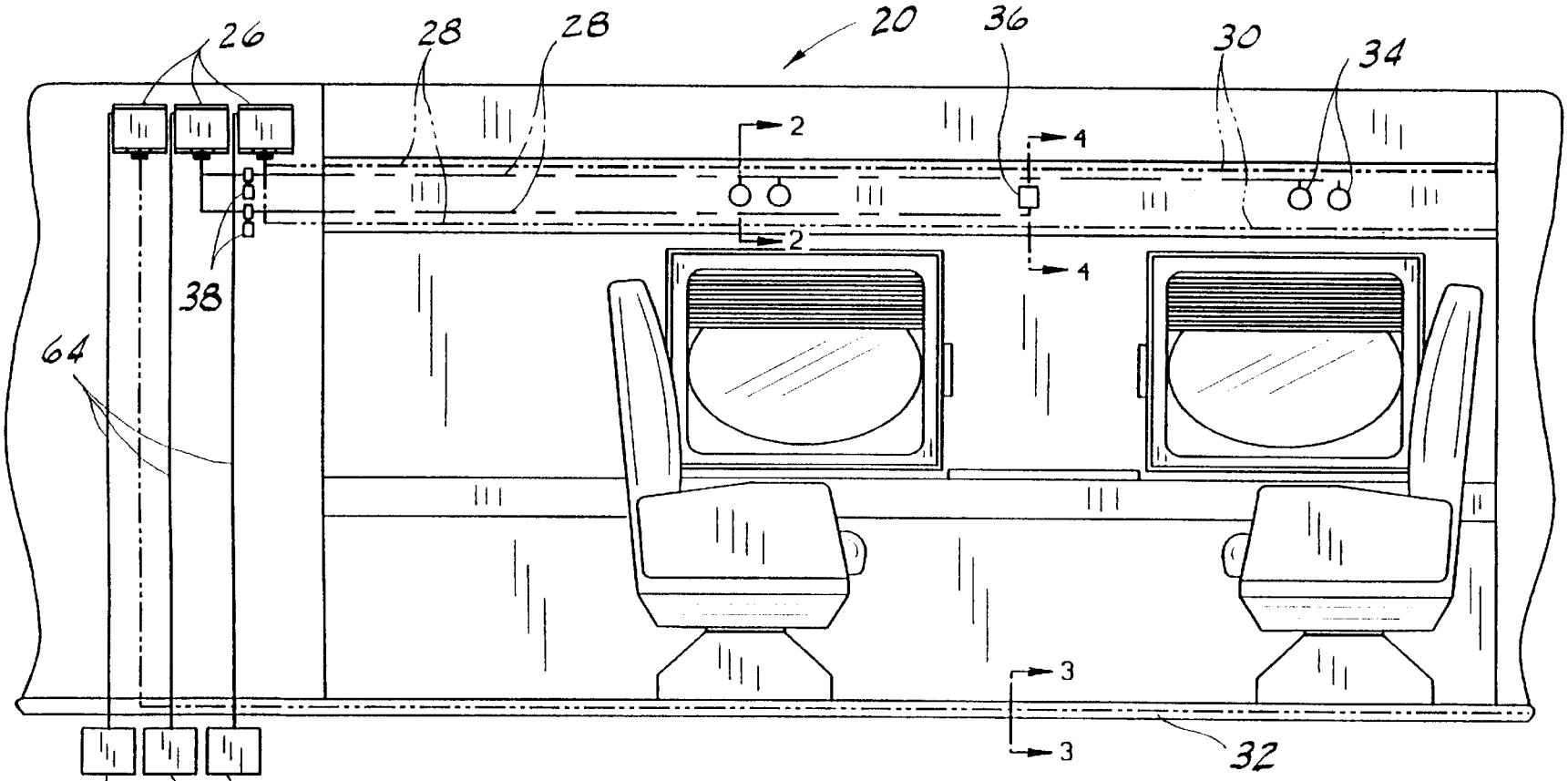
FIG. 1 is a side elevation view of an aircraft interior showing a schematic representation of the fiber-optic lighting system of the present invention.
Figure 2:
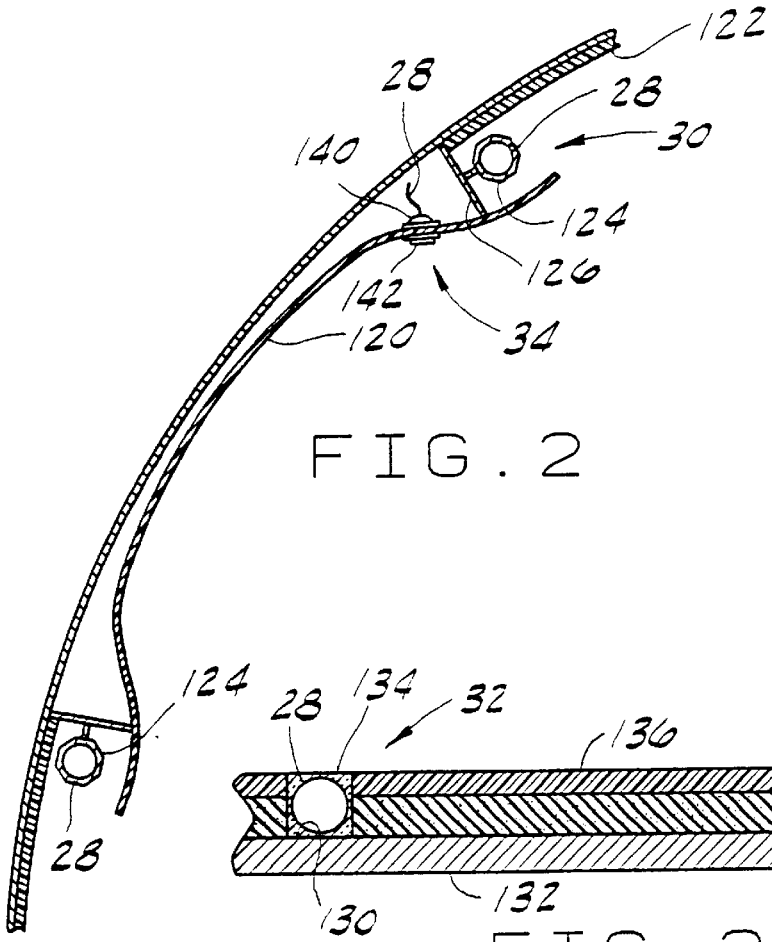
FIG. 2 is a cross-sectional view of an aircraft valance and a reading light fixture of the present invention taken in the plane of line 2—2 of FIG. 1.
Figure 3:
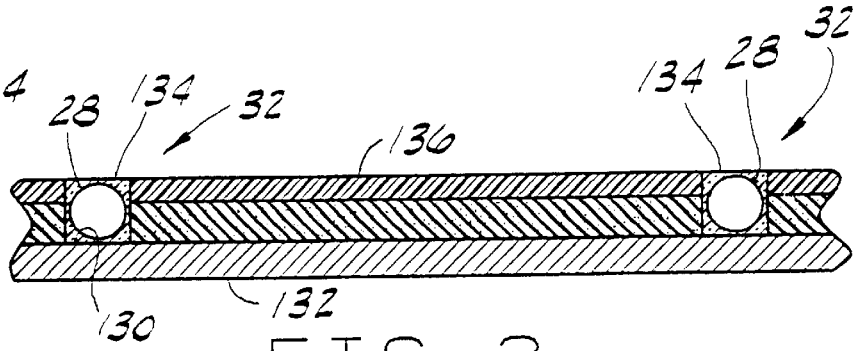
FIG. 3 is a cross-sectional view of an emergency floor strip light fixture of the present invention taken in the plane of line 3—3 of FIG. 1.
Figure 4:
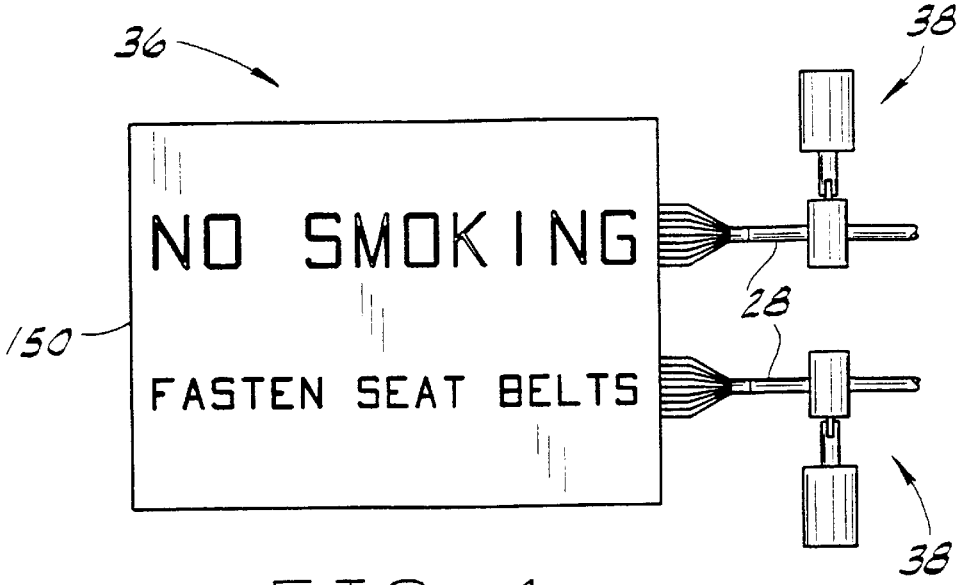
FIG. 4 is a front elevation view of a passenger indicator light fixture of the present invention.

Although equally well suited for other environments where lighting is necessary, the preferred embodiment of the present invention is intended for use in the interiors of passenger aircraft as shown in FIG. 1. The fiber-optic lighting system 20 is generally comprised of remote power supplies 22, 24 connected to high intensity light sources 26. Light guides or fiber-optic cables 28 extend from the light sources 26 to various light fixtures 30, 32, 34, 36 throughout the cabin. These light fixtures may be used to replace most any type of light fixture commonly used in aircraft interiors including valance mounted light fixtures 30 used for general cabin lighting and reading light fixtures 34 as best shown in FIG. 2. In addition, the light fixtures include emergency floor strip light fixtures 32 and passenger signal indicators as shown in FIGS. 3 and 4, respectively. Switches 38 may be placed in series with the light guides 28 to alternately permit or inhibit light from reaching the light fixtures 30, 32, 34, 36.

The principal power supply 22 provides electric power to the high intensity light sources 26. Although the output from the principal power supply 22 may vary depending upon the light source 26 chosen, the input to the power supply will be either 115 volts alternating current at 400 cycles per second or 28 volts direct current to correspond with standard aircraft electricity generated by the aircraft auxiliary power units (APU's) or other types of on board power generation units (not shown). Each principal power supply 22 includes a ballast resistor which gives a substantially constant current over a range of voltages. The substantially constant current from the ballast resistor eliminates perceptible light flickering and dimming which may cause passenger eye strain and irritation. The power supply 22 may also include an electrical power on-off switch to enable the electricity to the power supply to be turned on and off. In addition, a variable resistor may be incorporated into the power supply 22 to vary the amplitude of the current output to the light source 26 to control the brightness of the light source by changing the amplitude of the current. Thus, the brightness of the light emitted from the whole lighting system may be controlled by varying the resistance of the variable resistor.

An auxiliary power supply 24 may also be included in the lighting system to supply electricity to one or more of the light sources 26. This auxiliary power supply 24 is a standard short-term electric storage device used in aircraft for emergency lighting and other power needs in the event of principal power supply interruption. In the embodiment shown in FIG. 1, two principal power supplies 22 are used for a majority of the lighting needs and one auxiliary power supply 24 is used for emergency floor strip lighting. However, other combinations of principal and auxiliary power supplies may also be used without departing from the scope of this invention.

Figure 5:
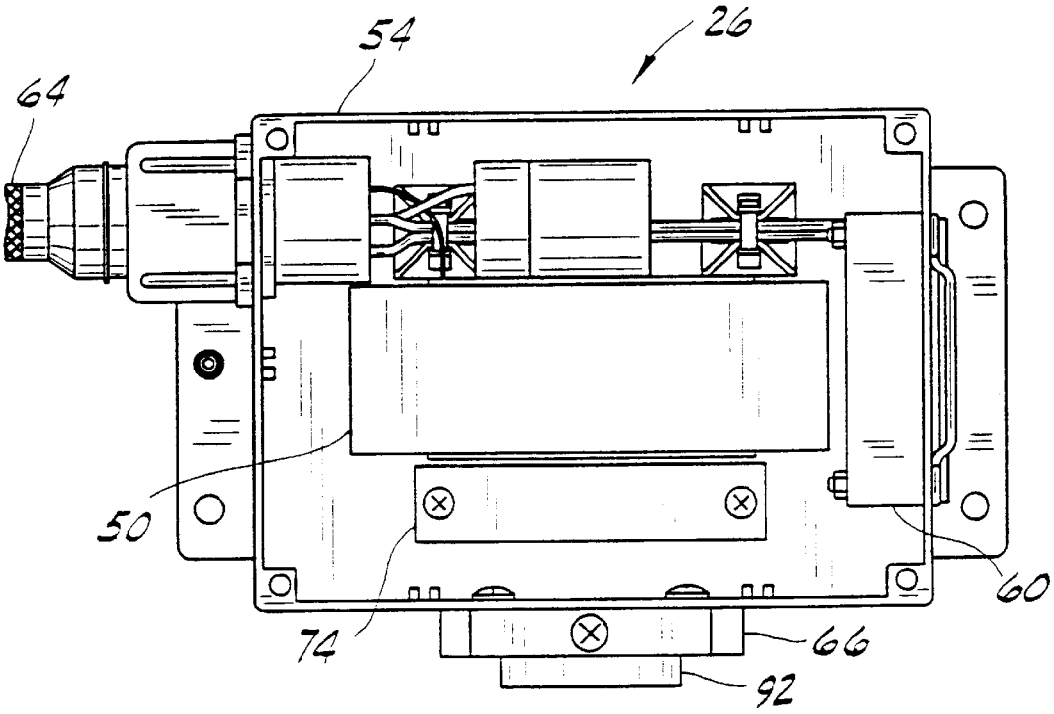
FIG. 5 is a top plan of a light source showing the housing interior.
Figure 6:
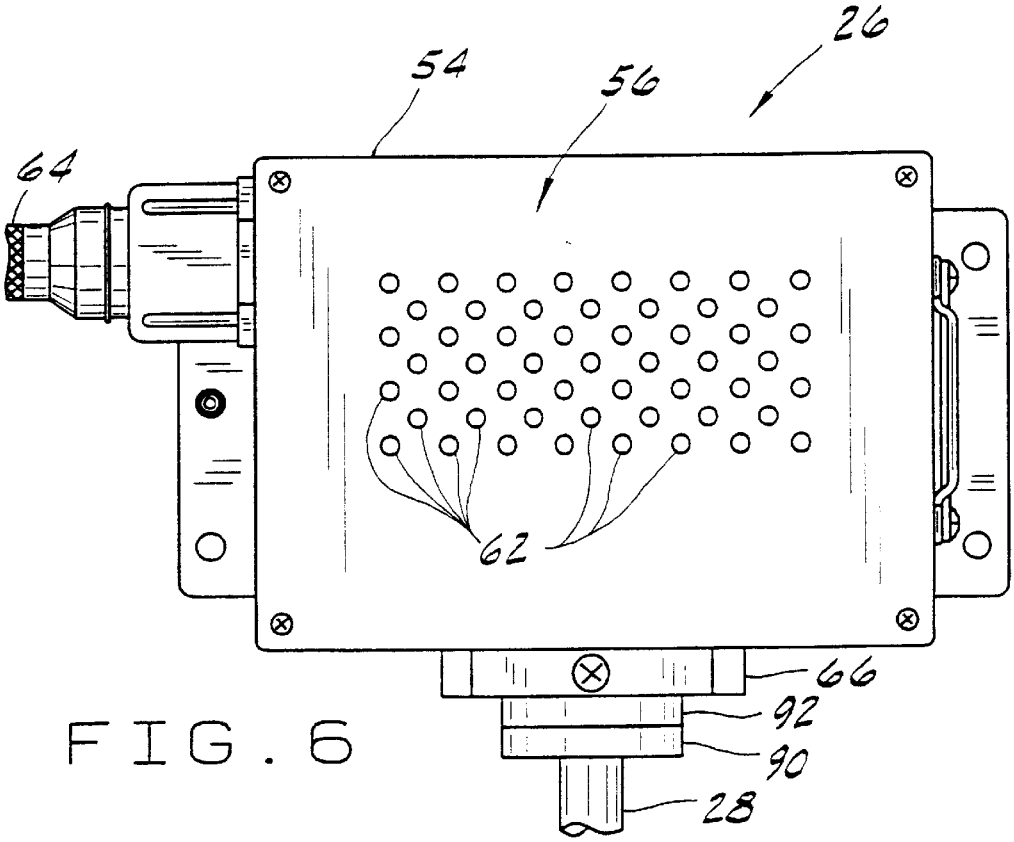
FIG. 6 is a top plan of the light source showing the housing exterior.

As shown in FIGS. 5 and 6, the light source 26 of the preferred embodiment includes a high intensity discharge lamp 50. The primary difference between the light source 26 of the present invention and those of previous systems is that the light source of the present invention is remotely located with respect to the light fixtures which the light source illuminates. Although high intensity discharge lamps within the range from 60 to 175 watts are primarily contemplated, lamps outside this range are also within the scope of the present invention. A variety of gaseous materials are available for high intensity discharge lamps and each type of material provides different characteristics. For instance, the color and brightness of the illumination produced by the lamp are affected by the material used. In addition, the durability is affected by the material used. In the best mode currently contemplated, the high intensity discharge lamp is a xenon metal halide 60 watt lamp.

Because high intensity discharge lamps 50 give off relatively high amounts of heat as compared to other light sources, certain provisions must be made to avoid fire and injury, as well as to prolong the life of the lamp. The lamp 50 is mounted within a housing 54 to prevent contact with the lamp. Preventing contact with the lamp 50 reduces the opportunity for and severity of injuries to persons who might otherwise come in direct contact with the lamp. The housing 54 also prevents contact between the lamp 50 and materials which might catch fire. In addition, the housing 54 prevents objects which might damage the lamp 50 from making contact with the lamp. Not only does the housing 54 prevent contact with the lamp 50, but it also directs cooling air over the lamp to improve the heat dissipation. To this end, a pancake fan 60 is positioned at one end of the housing 54 to exhaust air from the housing 54 to cool the lamp 50. Holes 62 are punched or drilled in the lid 56 of the housing 54 to permit air to enter into the housing to cool the lamp 50.

An electrical power cord 64 supplies electrical power to the lamp. Attached to another side of the housing 54 is a light guide receptacle 66 which is configured to receive the end of the light guide 28 and to hold it at the optimal distance from the lamp 50. The receptacle 66 is positioned so that the focal point of the high intensity discharge lamp 50 is centered on the end of the light guide 28. In this way, the highest intensity of light enters the light guide 28 and may be transmitted to the various light fixtures 30, 32, 34, 36 positioned throughout the aircraft.

Figure 8:
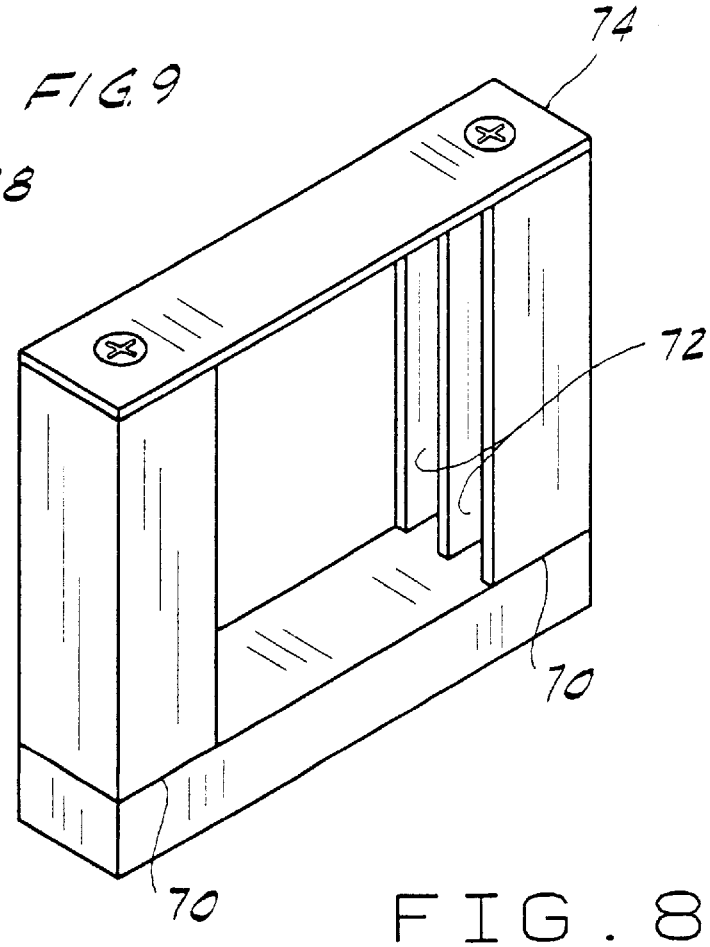
FIG. 8 is an orthographic projection of a filter bracket.

Brackets 70 are mounted on either side of the high intensity discharge lamp 50 between the receptacle 66 and lamp. As shown in detail in FIG. 8, each bracket 70 has a plurality of channels 72 milled on the side of the bracket facing the other bracket. These channels 72 are configured to hold filters (not shown) between the lamp 50 and the receptacle 66. A cover plate 74 is fastened to the brackets 70 to hold the filters in place. Various types of filters may be used to prevent different wavelengths of light energy from passing through the filter to the light guide 28. For instance, light within the ultraviolet spectrum may be filtered out because it may be harmful to persons in the aircraft. Likewise, the light within the infrared light range may be filtered because it heats the light guides 28 and may even heat the light guides sufficiently to cause damage to the lighting system. Color filters may also be placed between the lamp 50 and receptacle 66 to alter the color or brightness of the light transmitted to the light guides 28 and ultimately to the aircraft cabin.

The type of fiber-optic light guides 28 used in the lighting system of the present invention may be of either a solid core or a multiple fiber core type. Light guide diameters within the a range from 0.020 inches to one inch are contemplated but other sizes are also within the scope of this invention. Further, the light guides 28 may be a bundle of fibers of varying diameters and individual fibers may branch off from the bundle to deliver light to various fixtures 30, 32, 34, 36 throughout the aircraft.

A focussing head 90 is mounted on the first end of the light guide 28. In the preferred embodiment, the light guide 28 is threaded through a hole in the head 90 and is bonded in place in the light guide with an adhesive as is well known in the art. Alternatively, other means of attaching the light guide 28 to the focussing head 90 may be used. Once attached to the head 90, the end of the guide 28 is cut flush with the head and polished to a high gloss finish to reduce entrance losses to the guide. Reduction in entrance losses improves the overall light transmissivity of the light guide 28 which improves the lighting system performance. One or more spacers 92 are mounted between the focussing head 90 and receptacle 66. These spacers 92 are available in a variety of lengths. The specific length is chosen such that the polished cable end is substantially centered at the focal point of the high intensity discharge lamp 50. As mentioned above, centering the cable end at the focal point assures that the maximum amount of light enters the light guide 28 for transmission throughout the aircraft. The focussing head 90, spacer 92 and receptacle 66 are fastened together using set screws or mating threads cut into each of the components. Alternately, other fastening means as are well known in the art may be employed.

The light guides 28 extend from the light source 26 to various light fixtures 30, 32, 34, 36 positioned throughout the aircraft interior. Light energy is delivered to the light fixtures 30, 32, 34 36 in one of two modes, a side-illumination mode or an end-illumination mode.

The side-illumination mode uses light emitted through the side of the light guide 28. As light is transmitted through the light guide 28, some light energy escapes through the side of the guide. Depending upon the light guide configuration, the amount of light energy escaping throughout the side may be increased or decreased. The light guides are used in the side-illumination mode in light fixtures where fluorescent lighting has been typically used in conventional aircraft lighting systems. These light fixtures include the valance mounted "upwash" and "downwash" general cabin light fixtures 30 as shown in FIG. 2, as well as the floor mounted emergency strip light fixtures 32 as shown in FIG. 3 as will be explained in greater detail below. When used in the side-illumination mode, the sides of the light guides may be coated or textured to promote the transmission losses and thereby allow more light to escape through the side of the light guide. Likewise, the end of the light guide opposite the light source may be treated as well known in the art to prevent light from escaping through the end and may also direct the light back along the light guide where it may be emitted from the side.

Figure 9:
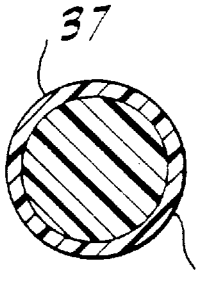
FIG. 9 is a cross section of a shielded light guide.

The fiber-optic cables 28 are used in an end-illumination mode to direct the light to a light fixture at an end of the light guide opposite the light source. These light fixtures are used to replace fixtures where incandescent lamps have been used in conventional aircraft lighting systems. These fixtures include reading light or galley light fixtures 34 as shown in FIG. 2, and cabin passenger signal indicators 36 as shown in FIG. 4, as well as other cabin lighting as will be explained in greater detailed below. As is well known in the art, when used in the end-illumination mode, the light guides may be shielded to reduce the transmission losses along their length. An example of a light guide 28 having conventional shielding 37 is shown in FIG. 9.

Figure 7:
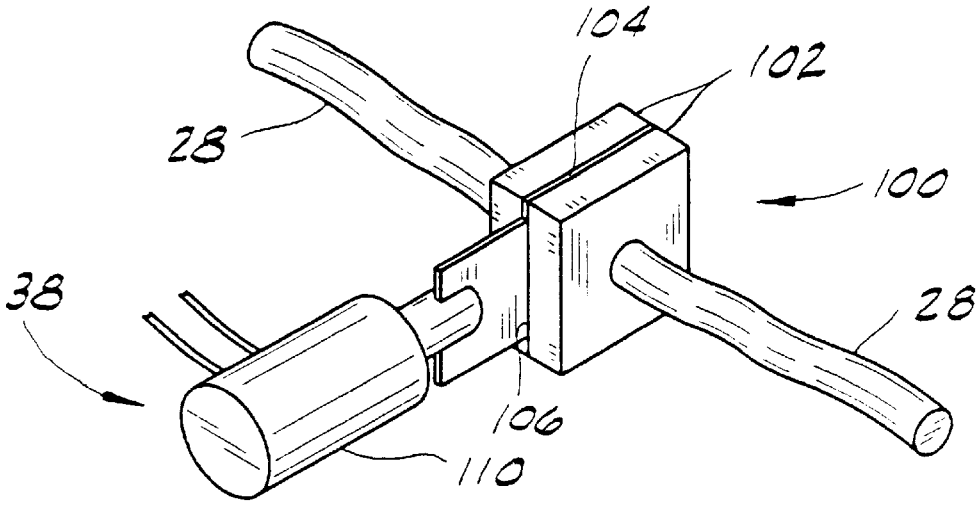
FIG. 7 is an orthographic projection of a light switch.

As shown in FIG. 7, switches 38 may be located at various selected locations along the length of the light guides 28 to alternately permit and inhibit light from being transmitted to the light fixtures 30, 32, 34, 36. Each switch 38 is comprised of a three part frame 100 mounted along the fiber-optic light guide 28. In the preferred embodiment, the switch 38 is mounted along the light guide; however, the switch might also be positioned adjacent either end of the light guide. Matching fittings 102 are located on each end of the frame 100 and make up two of the three parts of the frame. These fittings 102 hold the ends of the light guides 28 in much the same way as the light source receptacle 66 holds the end of the light guide. The light guide 28 ends are threaded through holes within the fittings 102 and bonded in place to ensure proper alignment. Then the bonded ends are cut flush with respect to the fittings 102 and are polished to a fine surface finish to enhance the light emitting and receiving characteristics of the ends to reduce entrance and exit losses. Reducing the entrance and exit losses improves the light transmission through the switch 38.

The central part of frame 100 is a gate housing 104. A slot 106 extends through the gate housing 104 and between the polished end of the fiber-optic cable 28 mounted in the end fittings 102. A shutter 108 is sized so that the shutter may reciprocate within the slot 106 between an open and a closed position. The shutter 108 extends between the fiber-optic cable ends in the closed position to inhibit light from passing through the switch 38. Alternately, the shutter 108 may be moved to the open position wherein the fiber-optic cable ends are exposed to one another to permit light to pass through the switch 38 from one cable end to the other. The shutter 108 is connected to an actuator 110 which may be remotely activated to drive the shutter between the open and closed positions. The actuator 100 may either be an electrical solenoid, a pneumatic actuator, or an electrical servo motor depending upon the type of drive source which is available.

The controls (not shown) for the switches 38 may be positioned in various locations throughout the aircraft. For instance, the controls may be grouped on a panel remote from passengers where the controls may be accessed by the aircraft crew. Alternatively, the controls may be separately located within the reach of seated passengers to enable the passengers to turn reading lamps on and off. Other alternative embodiments are also within the scope of this invention. For instance, lenses may be placed in the fittings 102 adjacent the ends of the cables to focus and more efficiently transmit the light through the switch 38. Also, the shutter 108 may be replaced with filters or screens to permit the intensity of the light being transmitted through the switch 38 to be varied.

As mentioned previously, the light guides are primarily used in the side-illumination mode in two types of light fixtures used at various locations throughout the aircraft. One of these light fixtures in a valance light fixture 30 used for general cabin lighting and the other is an emergency floor strip light fixture 32 used for directing passengers to emergency exits during low visibility emergency situations.

The valance light fixtures 30 are typically positioned high on the cabin walls above the heads of seated passengers. These light fixtures may be mounted between valances 120 or overhead luggage racks (not shown) and the cabin wall 122. Valances 120 are typically used in business jets and small commercial aircraft and overhead luggage racks are typically used on larger passenger aircraft. Because the side illumination light fixtures 30 are similar whether used in valances or luggage racks, only the valance embodiment will be discussed in detail. Nonetheless, modifications to the fixture as required for use behind a luggage rack are also within the scope of this invention. The valance light fixtures 30 are simply formed by running a fiber-optic light guide 28 between the valance 120 and the side of the aircraft cabin. Clips 124 or other fasteners may be positioned at various distances along the valance 120 to hold the light guide 28 in place. Reflectors 126 may be incorporated into the valance 120 to direct the light being emitted from the light guide 28 toward the cabin interior. In the preferred embodiment, these reflectors 126 have a flat white surface which reflects the light toward the cabin and provides a diffused soft light. The clips 124 elevate the light guide 28 above the reflector 126 to enable more light to be reflected toward the cabin interior. The reflectors 126 may be positioned either above or below the light guide 28 to direct the light emitted from the light guides either downward or upward to thereby provide both "downwash" and "upwash" lighting. Further, as shown in FIG. 2, two or more light guides may be positioned behind a single valance to simultaneously provide both "upwash" and "downwash" lighting. Alternatively, a single light guide may be used depending upon the desired result.

As the light emerges from behind the valance 120, the light bounces off the cabin walls and ceiling to provide general cabin lighting. This indirect lighting gives a warm glow to the cabin interior rather than causing a harsh light as is often provided by direct lighting. The interior of the aricraft is typically light colored which enables the light to bounce off of the interior surfaces of the cabin to bathe the cabin in light and to provide a pleasant general cabin lighting.

Shielding may be included on the side of the light guide 28 facing the center of the valance to improve the efficiency of the light guide and prevent illumination losses along the light guide length. The shielding improves the light guide transmission efficiency by preventing light from escaping in an undesired direction and by reflecting the light back into the light guide where it may be emitted in a desirable direction. The reflector 126 may be eliminated if desired, particularly if the shielding is included.

The light guides 28 may also be used in the side-illumination mode to illuminate emergency floor strip light fixtures 32 which outline the sides of the aisles in the event of power loss. The floor strips glow to show passengers the aisle in low visibility situations such as in darkness or when the cabin is filled with smoke or vapor. As is standard in the industry, the strip 32 generally has a white illumination except adjacent exits where the strip is made to have a red illumination to identify the exit location.

The light guides 28 run in tracks 130 within the floor 132 of the aircraft cabin and are mounted in translucent cover strips 134 positioned within the tracks 130. The cover strips 134 prevent the light guides 28 from becoming scratched which would increase the transmission losses. To prevent passengers from tripping over the strips, the cover strips 134 are mounted with the top surface of the strips even with the top surface of the carpet 136. As with the valance light fixtures 30, a reflector may be mounted beneath the light guide 28 in the emergency floor strip light fixtures 32 to direct the light upward through the translucent light strips 134. Additionally, shielding may be used on the bottom of the light guide 28 to improve the light transmitting characteristics of the light guide. Because the power supply 24 must be uninterruptible when used for emergency lights, a battery or other electricity storage device as described above supplies the power to the light source 26 used to light the emergency floor strip light fixtures 32.

The aircraft reading light fixtures 34 use the light guide 28 in the end-illumination mode. The reading light fixtures 34 are comprised of a reflector 140 mounted to the end of the corresponding light guide 28. The end of the light guide 28 extends through a hole in the reflector 140 and may be polished as described with respect to the light source receptacle 66 and switch end fittings 102 above to reduce exit losses. A lens or filter 142 or both may be used to cover the reflector 140 to further focus or defuse the light being emitted from the fixture 34. Generally, the reading light fixtures 34 are positioned in the valance 120 or overhead luggage rack above the head of seated passengers. As is well known in the art, the reflectors 140 are approximately parabolically shaped to direct light to the desired target area such as a seated passenger's lap. Alternately, the reflectors may be configured to swivel to permit the passenger to aim the light at various desired target areas. A similar type of light fixture may be used for overhead flood lighting as is typically used to light work surfaces within the galley of the aircraft.

The light guides 28 typically used in the reading lights fixtures 34 are bundled cables comprising multiple fibers with each fiber measuring 0.020 to 0.040 or larger inches in diameter. These fibers are bundled and inserted into the focussing head 90 as explained above. Portions of the bundle branch out from the main bundle along the length of fiber-optic cable and carry the light to separate light fixtures 34. Each branch of the bundle makes up an individual light guide 28 which transmits light to a separate light fixture 34. As explained above, the switches 38 may be placed along these light guides 28 to selectively turn the reading lights on and off. The controls for the switches 38 may be placed within reach of the seated passenger to enable the passenger to turn the light on and off as desired.

An end-illumination mode light fixture similar to the reading light fixture 34 is used to illuminate passenger warning indicator light fixtures 36. These indicator light fixtures 36 are positioned throughout the aircraft cabin and include internationally understood standard indicia which are used throughout the industry. These indicia include exit markings, fasten-seat-belt markings and no-smoking markings. Transclucent domes or plaques 150 with these markings may be placed at the end of the light guides 28 and selectively illuminated to communicate the various indications to the passengers as needed. As with the side-illumination modes, any of the light guides used in the end-illumination modes may be shielded to inhibit illumination losses along the light guide length. Likewise, reflectors may be positioned behind the domes 150 to direct the light toward the dome to enhance the dome illumination. Alternately, the ends of the light guides 28 may be arranged to form the indicia. In the preferred embodiment, switches 38 which may be remotely controlled by the flight crew are placed along the light guides 28 to illuminate the appropriate indicia.

In addition to the variant embodiments outlined above, additional power supplies and/or light sources may be used to illuminate the light guides depending upon the desired lighting characteristics. In the preferred embodiment, separate power supplies and light sources are used for each of the light fixture types so that each lighting sub-system may be individually controlled. For instance, the general cabin lighting may be dimmed without affecting the individual reading lamp brightnesses. Similarly, the light source for the emergency lighting strips need not be illuminated unless there is a loss of cabin lighting. Alternatively, various sub-systems of the lighting system may be combined. For instance, it may be desirable that the indicator lights and general cabin lighting be dimmed and brightened simultaneously so that an equivalent level of contrast is always maintained between the sub-systems. If this is the case, a single light guide may be used for both the valance lighting and for signal indicator lighting. Thus, the same light guide would simultaneously be used in both a side-illumination and an end-illumination mode.

While the present invention has been described by reference to a specific embodiment, it should be understood that modifications and variations of the invention may be constructed without departing from the scope of the invention defined in the following claims.

What is claimed is:

1. A fiber-optic lighting system for lighting an interior of an aircraft, the interior having a wall, a floor and a ceiling, the lighting system comprising:

a power supply;

a high intensity light source connected to the power supply for generating a light beam and directing the beam along a path;

a first elongate light guide having first and second ends and a length extending between the first and second ends, the first end of the first light guide being positioned adjacent the light source and within the path of the light beam, the first light guide being configured to transmit light between the first and second ends of the first light guide;

a first lamp reflector connected to the second end of the first light guide for directing light transmitted to the second end of the first light guide into the aircraft interior;

a second elongate light guide having first and second ends and a length extending between the first and second ends, the first end of the second light guide being positioned adjacent the light source and within the path of the light beam, the second light guide having a side extending along the second light guide length, the second light guide being configured to emit light from the second light guide side as light is transmitted between the first and second ends of the second light guide; and an elongate light fixture positioned along the second light guide length for directing light emitted from the side of the second light guide into the aircraft interior.

2. The lighting system of claim 1 further comprising:

a switch connected in series with the first light guide for selectively blocking the transmission of light from the light source to the first lamp reflector.

3. The lighting system of claim 1 further comprising:

a third elongate light guide having first and second ends and a length extending between the first and second ends, the first end being positioned adjacent the light source and within the path of the light beam, the third light guide being configured to transmit light between the first and second ends of the third light guide; and a second lamp reflector connected adjacent the second end of the third light guide for directing light transmitted to the second end of the third light guide.

4. The lighting system of claim 3 further comprising:

a switch connected in series with the second light guide for selectively blocking the transmission of light from the light source to the second lamp reflector.

5. The lighting system of claim 1 further comprising:

a filter connected in series with at least one of the first and second light guides.

6. The light system of claim 5 wherein:

the filter is configured to inhibit the transmission of ultraviolet light.

7. The light system of claim 5 wherein:

the filter is configured to inhibit the transmission of infrared light.

8. A fiber-optic lighting system for lighting an interior of an aircraft, the interior having a wall, a floor and a ceiling, the lighting system comprising:

a power supply;

a high intensity light source connected to the power supply for generating a beam of light and directing the beam along a path;

an elongate light guide having first and second ends and a length extending between the first and second ends, the first end being positioned adjacent the light source and within the path of the light beam, the light guide having a side extending along the length, the light guide being configured to emit light from at least a portion of the side as light is transmitted between the first and second ends;

a lamp reflector connected to the second end of the light guide for directing light transmitted to the second end into the aircraft interior; and an elongate light fixture positioned along the side of the light guide for directing light emitted from the portion of the light guide side into the aircraft interior.

9. The lighting system of claim 8 further comprising:

a switch connected in series with the light guide for selectively blocking the transmission of light to the lamp reflector without interfering with the transmission of light to the elongate light fixture.

10. The lighting system of claim 8 further comprising:

a second elongate light guide having first and second ends and a length extending between the first and second ends, the first end being positioned adjacent the light source and within the path of the light beam, the second light guide being configured to transmit light between the first and second ends of the second light guide; and a second lamp reflector connected adjacent the second end of the second light guide for directing light transmitted to the second end of the second light guide.

11. The lighting system of claim 8 further comprising:

a filter connected in series with the light guide.

12. The light system of claim 11 wherein:

the filter is configured to inhibit the transmission of ultraviolet light.

13. The light system of claim 11 wherein:

the filter is configured to inhibit the transmission of infrared light.

14. An aircraft lighting system for lighting the interior of an aircraft, the interior having a wall, a floor and a ceiling, the system comprising:

a power supply;

a high intensity light source connected to the power supply for generating a beam of light and directing the beam along a path;

a first elongate light guide having first and second ends and a length extending between the first and second ends, the first end of the first light guide being positioned adjacent the light source and within the path of the light beam, the first light guide being configured to transmit light between the first and second ends of the first light guide;

a lamp reflector mounted within the interior of the aircraft and connected to the second end of the first light guide for directing light transmitted to the second end of the first light guide;

a second elongate light guide having first and second ends with a length extending between the first and second ends and a side extending along the length, the second light guide being positioned along one of the aircraft wall, floor and ceiling with the first end positioned within the path of the light beam generated by the light source, the second light guide being configured to emit light from the side as light is directed into the first end of the second light guide; and an elongate light fixture positioned along the second light guide length.

15. The lighting system of claim 14 wherein:

the elongate light fixture is a reflective light fixture mounted adjacent one of the aircraft wall and ceiling, the fixture being configured to direct light emitted from the side of the second light guide toward one of the aircraft wall and ceiling for general aircraft lighting.

16. The lighting system of claim 14 wherein:

the elongate light fixture is an emergency light having a indicator strip mounted adjacent the aircraft floor, the fixture being configured to direct light emitted from the side of the second light guide toward the indicator strip to guide passengers toward an aircraft exit in an emergency.

17. The lighting system of claim 14 further comprising:

a third elongate light guide having first and second ends and a length extending between the first and second ends and a side extending along the length, the third light guide being positioned along one of the aircraft wall and ceiling with the first end positioned adjacent the light source and within the path of the light beam, the third light guide being configured to emit light from the side as light is directed into the first end of the third light guide; and a second elongate light fixture positioned along the third light guide length, the second light fixture being a reflective light fixture mounted adjacent one of the aircraft wall and ceiling, the fixture being configured to direct light emitted from the side of the third light guide toward one of the aircraft wall and ceiling for general aircraft lighting.

18. The lighting system of claim 14 wherein:

the aircraft includes a plurality of seats attached to the aircraft floor; and the lamp reflector is a reading lamp reflector positioned above one of the plurality of aircraft seats.

19. The lighting system of claim 14 wherein:

the aircraft includes a galley having a work surface; and the lamp reflector is a flood lamp reflector positioned above the galley work surface.

20. The lighting system of claim 14 further comprising:

an indicator positioned adjacent the second end of the first light guide, the indicator being configured to be illuminated to signal passengers.

21. The lighting system of claim 20 wherein:

the indicator includes at least one indicium selected from a group of indicia comprising no-smoking, fasten-seat-belt and exit indicia.

22. The lighting system of claim 14 wherein:

the high intensity light source includes at least two lighting elements, each of the lighting elements providing a separate beam of light directed along a separate path; and one of the first ends of the first and second light guides is positioned within the light beam path of one of the light elements, and the other of the first ends of the first and second light guides is positioned within the light beam path of the other of the light elements.

23. The lighting system of claim 14 further comprising:

an alternate high intensity light source connected to the power supply for providing a light beam directed along a path to the first ends of the first and second light guides upon failure of the first light source.

24. The lighting system of claim 14 further comprising:

a switch connected in series along the first light guide for selectively blocking the transmission of light to the lamp reflector.

25. The lighting system of claim 24 wherein:

the aircraft includes a plurality of seats attached to the aircraft floor; and the lamp reflector is a reading lamp reflector positioned above one of the plurality of aircraft seats and the switch is operable by a person seated within the one aircraft seat.

26. The lighting system of claim 14 wherein:

the light guide includes shielding for inhibiting light transmission losses along the length of the guide.

*27. A fiber-optic lighting system for lighting an interior of an aircraft, the lighting system comprising:*

*a high intensity light source for generating a light beam and directing the beam along a path;*

*a first elongate light guide having first and second ends, the first end of the first light guide being positioned within the path of the light beam for transmitting light from the first end to the second end of the first light guide;*

*a first light fixture connected to the second end of the first light guide for directing light transmitted to the second end of the first light guide into the aircraft interior;*

*a second elongate light guide having first and second ends and a length extending between the first and second ends, the first end of the second light guide being positioned within the path of the light beam for transmitting light from a side of the second light guide extending along the length of the second light guide; and*

*a second light fixture positioned along the second light guide length for directing light emitted from the side of the second light guide into the aircraft interior.*

*28. A fiber-optic lighting system as set forth in claim 27 wherein the first light guide is continuous and one piece, and the second light guide is continuous and one piece.*

*29. A fiber-optic lighting system for lighting an interior of an aircraft, the light system comprising:*

*a high intensity light source for generating a beam of light and directing the beam along a path;*

*an elongate light guide having a first end positioned within the path of the light beam, a second end opposite the first end and a side extending between the first and second ends, wherein the light guide is configured to emit light from at least a portion of the side as light is transmitted between the first and second ends;*

*a reflector connected to the second end of the light guide for directing light transmitted to the second end; and*

*an elongate light fixture positioned along the side of the light guide for directing light emitted from the side of the light guide into the aircraft interior.*

* * * * *